(12) United States Patent
Thetford et al.

(10) Patent No.: US 6,197,877 B1
(45) Date of Patent: Mar. 6, 2001

(54) DISPERSANTS

(75) Inventors: Dean Thetford; John David Schofield; Patrick John Sunderland, all of Manchester (GB)

(73) Assignee: Zeneca Limited, London (GB)

( * ) Notice: Subject to any disclaimer, the term of this patent is extended or adjusted under 35 U.S.C. 154(b) by 0 days.

(21) Appl. No.: 09/297,362

(22) PCT Filed: Oct. 1, 1997

(86) PCT No.: PCT/GB97/02698

§ 371 Date: Apr. 30, 1999

§ 102(e) Date: Apr. 30, 1999

(87) PCT Pub. No.: WO94/21368

PCT Pub. Date: Sep. 29, 1994

(30) Foreign Application Priority Data

Nov. 1, 1996 (GB) .................................................. 9622783

(51) Int. Cl.[7] .................................................. C08L 67/00
(52) U.S. Cl. ........................... 524/599; 524/539; 528/354
(58) Field of Search ..................... 524/539, 599; 528/354

(56) References Cited

FOREIGN PATENT DOCUMENTS

| | | |
|---|---|---|
| 164817 | 12/1985 | (EP) . |
| 192160 | 8/1986 | (EP) . |
| 208041 | 1/1987 | (EP) . |
| 551766 | 7/1993 | (EP) . |
| 660178 | 6/1995 | (EP) . |
| 713894 | 5/1996 | (EP) . |
| 94/21368 | 9/1994 | (WO) . |
| 96/14344 | 5/1996 | (WO) . |

OTHER PUBLICATIONS

Database WPI, Section Ch, Week 9125, Derwent Publications Ltd., Class A23, AN 91–181472, XP002054494 & JP 03 109 419 A, May 9, 1991.
Polymer Preprints, (Am.Chem.Soc.,Div. of Polym.Chem) vol 31, No. 1, (1990) pp. 20–21, XP002054493.

*Primary Examiner*—Patrick D. Niland
(74) *Attorney, Agent, or Firm*—Pillsbury Madison & Sutro LLP

(57) ABSTRACT

A dispersant of general Formula I $$T-(A)_n(B)_p-Z \qquad (1)$$

wherein

T is hydrogen or a polymerisation terminating group;

Z is an acidic or basic group or a moiety containing either an acidic or basic group;

A and B are each, independently, oxyalkylene carbonyl groups derivable from δ-valerolactone, ε-caprolactone or alkyl substituted ε-caprolactone provided that both are not ε-caprolactone or δ-valerolactone;

n and p are integers; and n+p is from 2 to 100; including salts thereof.

Specific examples of dispersants are the reaction product of lauric acid, δ-caprolactone, 7-methyl-ε-caprolactone with PEI, the reaction product of lauric acid, ε-caprolactone, δ-valerolactone with PEI and the phosphate of the reaction product of dodecanol, ε-caprolactone and δ-valerolactone.

39 Claims, No Drawings

DISPERSANTS

This invention relates to a new class of dispersants, to dispersions containing such dispersants together with a particulate solid and an organic medium, to millbases and the use of such dispersions and millbases in paints and printing inks.

Dispersants containing a poly(oxypentamethylene carbonyl) chain are well known and are generally prepared by polymerisation involving ε-caprolactone. They are said to be particularly useful for dispersing particulate solids in an organic liquid media and contain either acid or basic terminating groups. Dispersants containing terminal basic groups are described in EP 208041 and WO94/21368 and include the reaction products of poly(ethyleneimine) with ε-caprolactone in the presence of aliphatic or hydroxy-aliphatic carboxyl acids as chain terminators during the polymerisation of the ε-caprolactone. Dispersants containing terminal acid groups are described in EP 164817 and include phosphate esters of ε-caprolactone polymerised in the presence of a fatty alcohol as chain terminator.

It has now been found that superior dispersants can be made by replacing the ε-caprolactone used in the preparation of such dispersants by alkyl substituted ε-caprolactone either wholly or in part and by using a mixture of δ-valerolactone with optionally alkyl substituted ε-caprolactone. Dispersants derived from block or random copolymerisation of ε-caprolactone and alkyl substituted ε-caprolactone or from ε-caprolactone and δ-valerolactone have been found particularly advantageous.

According to the invention there is provided a dispersant of general Formula 1.

$$T—(A)_n(B)_p—Z \qquad (1)$$

wherein:

T is hydrogen or a polymerisation terminating group;

Z is an acidic or basic group or a moiety containing either an acidic or basic group;

A and B are each, independently, oxyalkylenecarbonyl groups derivable from δ-valerolactone, ε-caprolactone or alkyl substituted ε-caprolactone provided that both are not ε-caprolactone or δ-valerolactone;

n and p are integers; and n+p is from 2 to 100;

including salts thereof.

Preferably n+p is not greater than 70, more preferably not greater than 50 and especially not greater than 20.

When $(A)_n$ is derivable from ε-caprolactone and $(B)_p$ is derivable from either δ-valerolactone or alkyl substituted ε-caprolactone, the ratio of n:p is preferably between 12:1 and 1:6, more preferably between 8:1 and 1:2, even more preferably between 8:1 and 1:1 and especially between 4:1 and 1:1. Particularly useful effects have been achieved when the ratio of n:p is about 2:1.

Where Z is polyfunctional there may be more than one group $T—(A)_n(B)_p—$ atttached to each Z.

Preferably A is derivable from ε-caprolactone and B is derivable from alkyl substituted ε-caprolactone or δ-valerolactone.

The alkyl group(s) in ε-caprolactone may be linear or branched and is preferably $C_{1-8}$-alkyl, more preferably $C_{1-6}$-alkyl and especially $C_{1-4}$-alkyl. Examples of such groups are methyl and t-butyl.

The alkyl substituted ε-caprolactones are obtainable by oxidation of alkyl substituted cyclohexanone and consequently many are mixtures of alkyl substituted ε-caprolactone. Thus, the oxidation of 2-methyl cyclohexanone often results in a mixture of 7-methyl (95%) and 3-methyl ε-caprolactone (5%). However, the oxidation of 4-alkyl cyclohexanone results in only the 5-alkyl ε-caprolactone. Other examples of alkyl substituted ε-caprolactone are 6-methyl; 4methyl; 5-methyl; 5-tert butyl; 4,6,6-trimethyl and 4,4,6-trimethyl derivatives. 7-methyl ε-caprolactone is preferred.

(Co) polymerisation of the lactone precursors of the oxyalkylene carbonyl groups A and B in Formula 1 results in a poly(oxyalkylenecarbonyl) chain (hereinafter "POAC" chain) having a terminal hydroxy and terminal carboxylic acid group. The groups T and Z may, therefore, be attached to the (co) polymer either via oxygen or the group —COOO—. When Z is a basic group or a moiety containing a basic group such as a polyamine or polyimine the group T is preferably hydrogen or a polymerisation terminating group attached via the oxygen atom of the POAC. When Z is an acidic group or a moiety containing an acidic group such as carboxylate, sulphate, sulphonate, phosphonate or phosphate, the group T is preferably a polymerisation terminating group attached via the —COO— group of the POAC.

Preferred dispersants are derivable from either a POAC acid (i.e. a POAC chain having a terminal carboxylic acid group) which is end-capped by a polymerisation terminal group (hereinafter TPOAC acid) or from a POAC alcohol (i.e. a POAC chain having a terminal hydroxy group) which is end-capped by a polymerisation terminal group (hereinafter TPOAC alcohol).

According to a first aspect of the invention, the dispersant comprises a polyallylamine or especially a poly($C_{2-4}$-alkyleneimine) (hereinafter "PAI") carrying at least two POAC chains of Formula 2.

$$T—(O—V—CO)_{\overline{n+p}} \qquad (2)$$

wherein:

V is a POAC chain moiety $—(A)_n(B)_p^-$; and

T, n and p are as defined hereinbefore.

For clarity, the oxygen and carbonyl groups in the POAC chain of Formula 2 have been included to indicate the manner of attachment of the group T and do not represent additional oxygen or carbonyl groups over and above those present in the oxyalkylene carbonyl group $—(A)_n(B)_p^-$.

Each POAC chain is preferably linked to the polyallylamine or PAI through either a covalent amide link —CO—N< formed between a terminal carbonyl group of the POAC chain and the nitrogen atom of a primary or secondary amino group in the polyallylamine or PAI, or through an ionic salt link —COO⁻HN⁺≡formed between a terminal carboxylate group of the POAC chain and a positively charged nitrogen atom of a substituted ammonium group in the polyallylamine or PAI. Because the dispersant contains at least two POAC chains it may contain a mixture of amide and salt links depending on the severity of the reaction conditions used in its preparation.

The dispersant of the first aspect of the invention may be conveniently represented by the general Formula 3.

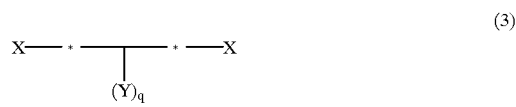

(3)

wherein:

X—*—*—X represents polyallylamine or PAI;

Y represents a POAC chain linked to polyallylamine or PAI via an amide or salt linkage;

q is from 2 to 2000; and

PAI and POAC are as defined hereinbefore.

Preferably q is not less than 4 and especially not less than 10. It is also preferred that q is not greater than 1000 and preferably not greater than 500.

It is also preferred that the weight ratio of the POAC chain represented by Y to the polyallylamine or PAI represented by X—*—*—X is between 30:1 and 1:1, more preferably between 20:1 and 4:1 and especially between 15:1 and 8:1.

The PAI is preferably a poly(ethyleneimine) which may be linear or branched (hereinafter PEI).

The PAI preferably has a weight-average molecular weight from 500 to 600,000, more preferably from 1,000 to 200,000, even more preferably from 1,000 to 100,000 and especially from 10,000 to 100,000.

The dispersant of the first aspect of the invention is obtainable by reacting polyallylamine or a PAI with a TPOAC acid of Formula 4 or by reacting polyallylamine or a PAI with a lactone(s) in the presence of a polymerisation terminating compound.

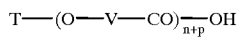

(4)

wherein:

T, V, n and p are as defined hereinbefore.

The length of the POAC chain may be controlled by the presence of a chain stopper or terminating compound, such as a carboxylic acid, in the preparative process. Where the dispersant contains POAC chains formed by the polymerisation of a lactone(s) in the presence of polyallylamine or a PAI there is less need for a chain stopper because the POAC chains grow on the polyallylamine or the PAI and cannot react together. In such cases the pendant POAC chains are terminated by hydroxy groups i.e. T is H in the TPOAC acid of Formula 4.

The dispersant may be derived from polyallylamine or a PAI having at least two primary, secondary or tertiary amino groups and a TPOAC acid or lactone(s) precursor thereof, in which case the reaction product of the amino groups in polyallylamine or the PAI and the terminal carboxy group of the POAC acid forms an amide or salt link. If the PAI contains tertiary amino groups, only salt links can be formed, otherwise salt and/or amide links are formed depending on the reaction conditions. Generally, mild reaction conditions such as low temperatures and/or short reaction times promote the formation of salt links and more severe reaction conditions such as high temperature and/or long reaction times promote the formation of amide links in a manner which is familiar to skilled chemists.

A preferred dispersant of the first aspect of the invention contains a terminating group T which is derived from a carboxylic acid which is preferably free from amino groups. Preferred carboxylic acids are $C_{1-25}$-aliphatic carboxylic acids which may be saturated or un-saturated and which may be substituted by hydroxy, $C_{1-4}$-alkoxy or halogen. Preferred aliphatic acids contain 10 or more carbon atoms. When the aliphatic carboxylic acid is substituted the substituent is preferably hydroxy. Examples of carboxylic acids are glycolic, lactic, caproic, lauric, stearic, methoxy acetic, ricinoleic, 12-hydroxy stearic, 12-hydroxydodecanoic, 5-hydroxydodecanoic, 5-hydroxydecanoic and 4-hydroxy decanoic acids.

When the dispersant of the first aspect of the invention contains free amino groups these may be converted into substituted ammonium groups by reaction with an acid or a quaternising agent so that the dispersant is in the form of a substituted ammonium salt. Suitable reagents for this purpose are mineral and strong organic acids or acidic salts such as acetic acid, sulphuric acid, hydrochloric acid, alkyl sulphonic acids, alkyl hydrogen sulphates and aryl sulphonic acids including acid forms of dyestuffs and pigments and quaternising agents such as dialkylsulphates, for example dimethysulphate (DMS) and alkyl halides such as methyl and ethyl chloride.

The dispersants of the first aspect of the invention are obtainable by reacting polyallylamine or PAI with a POAC acid or lactone precursor(s) thereof at a temperature between 50 and 250° C., preferably in an inert atmosphere and optionally in the presence of an esterification catalyst. Preferably, the temperature is not less than 80° C. and especially not less than 100° C. In order to minimise charring of the dispersant the temperature is preferably not greater than 150° C.

The inert atmosphere may be any gas which does not react with the final product or starting materials and includes the inert gases of the Periodic Table and especially nitrogen.

When the dispersant is prepared in a single stage by reacting polyallylamine or PAI, polymerisation terminating agent and lactone(s) it is preferable to include an esterification catalyst such as tetra-alkyl titanate, for example tetrabutyl titanate, zinc salt of an organic acid, for example, zinc acetate, zirconium salt of an aliphatic alcohol, for example zirconium isopropoxide, toluene sulphonic acid or a strong organic acid such as haloacetic acid, for example trifluoroacetic acid. Zirconium isopropoxide is preferred. When the dispersant of the first aspect of the invention is prepared by a single stage process, higher temperature may be required and these are typically from 150–180° C.

It is preferred to prepare the TPOAC acid separately, prior to reacting it with polyallylamine or PAI. In this case, the lactone(s) and polymerisation terminating agent are reacted together in an inert atmosphere at 150–180° C. in the presence of an esterification catalyst. The subsequent reaction of the TPOAC acid with polyallylamine or PAI may then be carried out at temperatures of 100–150° C.

Where the PAI is PEI, the weight ratio of TPOAC acid to PEI can be varied between wide limits depending whether the dispersant is ultimately to be used to disperse a particulate solid in a polar or non-polar organic medium. Useful results have been obtained using dispersants where the weight ratio of TPOAC acid to PEI is from 30:1 to 1:1, preferably from 20:1 to 5:1 and especially from 15:1 to 10:1.

According to a second aspect of the invention there is provided a dispersant of Formula 1 wherein Z is an acidic group or moiety which contains an acidic group selected from carboxylate, sulphate, sulphonate, phosphate and phosphonate.

A preferred dispersant of the second aspect of the invention is a compound of Formula 5.

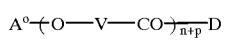

(5)

wherein:

$A^0$ and D are groups, one of which is or carries the acidic group and the other is a polymerisation terminating group which does not render the TPOAC chain hydrophilic; and V, n and p are as defined hereinbefore.

In the dispersant of Formula 5, when D carries the acidic group, $A^0$ is preferably the group $A^1$—CO— of an esterifiable carboxylic acid of formula $A^1$—COOH, in which $A^1$ is hydrogen or optionally substituted $C_{1-50}$-hydrocarbyl. Preferably $A^1$ is optionally substituted alkyl, alkenyl, cycloalkyl or polycycloalkyl. It is preferred that $A^1$ contains up to 35 and especially up to 25 carbon atoms. In this case, D is preferably a polyvalent, more preferably a di- or tri-valent, bridging group linking the acid group to the POAC chain and is preferably of the formula —K—G—J— wherein K is O, S, NR or a direct link and J is O, NR or a direct link in which R is H, alkyl, alkenyl, cycloalkyl or phenyl or where K and J are both NR, the two groups R may form a single alkylene or alkenylene group linking the two nitrogen atoms to which they are attached, and G is alkylene, alkenylene, cycloalkylene or arylene. The alkyl or alkenyl group in —K—G—J— preferably contains up to 20 carbon atoms and the cycloalkyl group preferably contains from 4 to 8 carbon atoms.

In the compound of Formula 5, when $A^0$ carries the acidic group, D is preferably the residue of an alcohol, thiol or primary or secondary amine, $D^1$—K—H in which $D^1$ is an aliphatic or alicyclic group of similar character to $A^1$ which is as defined hereinbefore. In this case, $A^0$ is preferably the acidic group itself and the POAC chain carries a terminal hydroxy group. This hydroxy group may be esterified to give a sulphate or phosphate group by reacting with a suitable sulphating or phosphating agent when the dispersant may contain one or more sulphate or phosphate ester groups, including mixtures.

Phosphate groups are preferred, and the preferred phosphating agent is $P_2O_5$, $POCl_3$ or polyphosphoric acid.

Optional substituents in $D^1$ and $A^1$ include halogen, hydroxy, amino, alkoxy and other non-ionic species providing they do not make the POAC chain hydrophilic in character.

Preferably, the group represented by $A^0$ or D which is remote from the acidic group contains at least 6 and more preferably at least 10 carbon atoms.

The acidic group in the second aspect of the invention may be in the free acid form or it may be present as a salt with a base such as ammonia, an amine, an aminoalcohol or an inorganic metal such as an alkali metal or alkaline earth metal.

One preferred dispersant of the second aspect of the invention is of general Formula 6.

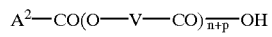
(6)

wherein:

$A^2$ is hydrogen or a monovalent hydrocarbon or substituted hydrocarbon group; and V, n and p are as defined hereinbefore.

$A^2$ is preferably alkyl which may be linear or branched, saturated or unsaturated. It is also preferred that $A^2$ contains at least 6 and preferably at least 10 carbon atoms. Preferably, $A^2$ contains not greater than 35 and especially not greater than 25 carbon atoms.

When $A^2$ is substituted, the substituents are as defined for $D^1$ and $A^1$.

A second preferred dispersant of the second aspect of the invention is of general Formula 7.

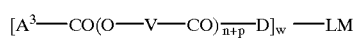
(7)

wherein:

$A^3$—CO is the residue of an esterifiable acid, $A^3$—COOH;

L is phosphonate, sulphonate or methylene carboxylate;

M is a cation;

w is 1 or 2; and

V, D, n and p are as defined hereinbefore.

$A^3$ is an optionally substituted aliphatic or alicyclic group. The aliphatic group may be linear or branched, saturated or unsaturated. Preferably, $A^3$ contains not greater than 35 and more preferably not greater than 25 carbon atoms. Optional substituents in $A^3$ are halogen, tertiary amino and $C_{1-6}$-alkoxy.

Preferably, $A^3$ is unsaturated.

An especially preferred dispersant of the second aspect of the invention is of general Formula 8.

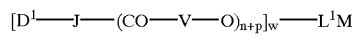
(8)

wherein:

$L^1$ is sulphate or phosphate; and $D^1$, J, V, M, n, p and w are as defined hereinbefore.

$D^1$ may be linear or branched, saturated or unsaturated and preferably contains not greater than 35 and especially not greater than 25 carbon atoms.

Preferably J is oxygen.

Optional substituents in $D^1$ are halogen, tertiary amino and $C_{1-6}$-alkoxy.

Preferably $D^1$ is unsubstituted.

Examples of the bridging group represented by D are —NHC$_2$H$_4$—, —OC$_2$H$_4$—, —OC$_2$H$_4$O—, —OC$_2$H$_4$NH—, —NH(CH$_2$)$_z$NH where z is from 2 to 5, piperazin-1,4-ylene and diaminophen-1,4-ylene.

Examples of the groups represented by $A^1$, $A^2$ and $A^3$ are methyl, ethyl, $CH_3(CH_2)_4$—, $CH_3(CH_2)_{10}^-$, $CH_3(CH_2)_{16}^-$, $HO(CH_2)_5^-$, $CH_3(CH_2)_7CH=CH(CH_2)_7^-$, $CH_3(CH_2)_{28}^-$, $CH_3(CH_2)_5CH(OH)CH_2CH=CH(CH_2)_7^-$ and $CH_3OCH_2^-$ and the residue of abietic acid i.e. abietic acid without the COOH group.

Examples of the group represented by $D^1$ are methyl, ethyl, $CH_3(CH_2)_9^-$, $CH_3(CH_2)_{11}^-$, $CH_3(CH_2)_{15}^-$, $CH_3(CH_2)_{17}^-$, $CH_3(CH_2)_{29}^-$, $CH_3(CH_2)_7CH=CH(CH_2)_7^-$, $CH_3OCH_2^-$, $CH_3(CH_2)_4CH=CHCH_2CH=CH(CH_2)_7^-$ and the residue of abietyl alcohol i.e. abietyl alcohol without the OH group.

The dispersants of the second aspect of the invention are obtainable by reacting a POAC acid having terminal hydroxy and carboxylic acid groups or a POAC acid which has a polymerisation terminal group and a hydroxy or carboxylic acid group (TPOAC compound) with a compound having a group reactive therewith and carrying a terminal acidic group. Alternatively, the POAC acid or TPOAC compound may be reacted directly with a precursor of the acidic group or with a bifunctional compound which is subsequently reacted with a precursor of the acidic group. In the above processes the POAC acid or TPOAC compound may be prepared in situ from a lactone(s) or a lactone(s) and polymerisation terminal compounds and converted directly to the dispersant of the second aspect of the invention. Suitable compounds containing the acidic group are α-amino or α-hydroxy alkane carboxylic acids, such as glycine and glycolic acid and amino-hydroxy-organic sulphonic or phosphonic acids, such as amino ethane sulphonic acid. Suitable precursors of the acidic group itself are $P_2O_5$ and polyphosphoric acid. Suitable bifunctional compounds which can form a linking group between the POAC acid or TPOAC compound and the acidic group are polyamines, polyols and hydroxyamines.

The dispersant of Formula 6 is obtainable by the polymerisation of a lactone(s) to give a POAC chain which is subsequently reacted with a carboxylic acid $A^2$—COOH which is free from hydroxy groups or by polymerising the lactone(s) in the presence of $A^2$—COOH which acts as polymerisation terminal compound. Examples of acids, $A^2$—COOH, are acetic, propionic, caproic, lauric and stearic acids and include those derived from a naturally occurring oil, such as tall oil fatty acid.

The POAC acid or lactone(s) precursor thereof may be reacted with $A^2$—COOH in a suitable hydrocarbon solvent such as toluene or xylene which can form an azeotrope with the water produced in the esterification reaction. The reaction is preferably carried out in an inert atmosphere such as nitrogen at a temperature between 80° and 250°, preferably from 150 to 180° C. Preferably, the reaction is carried out in the presence of an esterification catalyst as defined hereinbefore.

The dispersant of the second aspect of the invention is also obtainable by reacting a compound of Formula 6 with an appropriate co-reactant which also contains at least one acidic group and which is capable of reacting with the carboxylic acid group of the compound of Formula 6. Examples of groups capable of reacting with the carboxylic acid group are amines and hydroxy groups. Examples of co-reactants are amino-acids such as glycine and short chain hydroxy acids such as glycolic or lactic acid.

The dispersant of the second aspect of the invention is also obtainable by an indirect, two-stage process in which the compound of Formula 6 is reacted with a linking compound containing at least one reactive group which reacts with a carboxylic acid group such as hydroxy or amino and at least one other reactive group and the intermediate product so obtained is then reacted with a compound containing the acidic group and a group capable of reacting with said other reactive group of the linking compound. Suitable linking compounds include polyols, diamines and hydroxy amines such as ethylene glycol, propylene glycol, glycerol, trimethylol propane, pentaerythritol, sorbitol, ethylenediamine, trimethylenediamine, hexamethylenediamine, diethylenetriamine, ethanolamine, diethanolamine, dipropanolamine and tris(hydroxymethyl)aminomethane. Hydroxyamine linking compounds are preferred because of the different reactivities of the hydroxy and amino groups which reduces the formation of oligomeric intermediate products. Suitable linking compounds containing an acidic group and said other reactive group with which the compound of Formula 6 reacts include strong inorganic acids such as phosphoric acid, sulphuric acid, chlorosulphonic acid and sulphamic acid and organic salts such as alkyl- and aryl-phosphonic acids, alkyl- and aryl-sulphonic acids and monochloroacetic acid.

In preparing the dispersant of the second aspect of the invention from the compound of Formula 6, the reaction of the latter with the compound containing the acidic group (in the direct route) or with the linking compound (in the indirect route) is carried out under conditions which are appropriate to the reactants involved. Thus, in the case where the compound of Formula 6 is reacted directly with a functional acid such as glycine or glycolic acid the reactants may be heated together at a temperature from 180 to 250° C., if desired in the presence of a solvent such as xylene and also optionally in the presence of an esterification catalyst as hereinbefore defined until the acid value of the reaction mix has fallen to the appropriate level. The reactants are preferably used in approximately stoichiometric amounts with respect to the carboxy group in the compound of Formula 6 and the hydroxy or amino group in the compound bearing the acidic group. Similar conditions apply, in the case of the indirect route, to the reaction between the compound of Formula 6 and the linking compound, except that only one reactive group in the latter is utilised to ensure that the resulting intermediate product still contains said other reactive group available for subsequent reaction with the compound bearing the acidic group. When the linking compound is a hydroxyamine, the reaction temperature is preferably from 150 to 200° C. Here again, an inert solvent or diluent and/or catalyst may be present, if desired.

In the second stage of the indirect route, the intermediate product is reacted with the compound bearing the acidic group at a temperature and for a period of time sufficient for completion of the reaction as indicated by the attainment of a substantially constant acid value of the reaction mixture. When the compound containing the acidic group is a polybasic acid such as phosphoric acid or sulphuric acid, it is preferred that one or two, especially one, of the ionisable hydrogen atoms therein is reacted and that no attempt is made to remove the water formed in the reaction. Normally, the reaction is complete in about 3 hours at 40 to 70° C.; more stringent conditions are preferably avoided because of the risk of dehydration of the product, especially when sulphuric acid is used. These complications do not arise in the case of monochloroacetic acid, but the reaction proceeds more slowly and rather more forcing conditions are required. In general, the compound containing the acidic group is used in approximately stoichiometric amounts with respect to the available reactive group in the precursor but a lower or higher amount may be used, if desired.

The dispersant of Formula 7, in which J is a direct link, is obtainable by reacting a POAC acid having a terminal carboxylic acid group with an amino- or hydroxy-organic sulphonate and preferably an amino- or hydroxy alkyl phosphate. The dispersant of Formula 7 wherein J is NR or oxygen is obtainable by reacting a POAC acid with a diol or hydroxamino compound, such as an amino alcohol, and subsequently reacting the terminal hydroxy group of the intermediate formed with a phosphating agent such as $P_2O_5$ or polyphosphoric acid, or with a sulphonating agent, such as chlorosulphonic acid.

The dispersant of Formula 7, wherein K is a direct link, is obtainable by reacting a TPOAC acid of Formula 9

$$A^3CO(O—V—CO)_{n+p}—OH \quad (9)$$

with a compound of Formula 10

$$(H—K—G)_w LM \quad (10)$$

wherein $A^3$, V, K, G, L, M, n, p and w are as defined hereinbefore.

The dispersant of Formula 7 wherein K is O or NR is obtainable by reacting a TPOAC acid of Formula 9 with a compound of Formula 11

$$H—K—G—O—H \quad (11)$$

and subsequently reacting with a sulphating or phosphating agent.

The especially preferred dispersant of Formula 8 is obtainable by polymerising a lactone(s) in the presence of a monohydric alcohol or a primary or secondary monoamine to form a TPOAC alcohol having a terminal hydroxy group i.e. a POAC chain having a terminal hydroxy group and a polymerisation terminal group. Monohydric alcohols are preferred, especially those having up to 35 and more especially those having up to 25 carbon atoms. Lauryl alcohol is particularly preferred. The TPOAC alcohol is subsequently reacted with a phosphating or sulphating agent. Phosphating agents are preferred, especially $P_2O_5$ and polyphosphoric acid.

The TPOAC alcohol is obtainable by reacting a lactone(s) with a monohydric alcohol under similar conditions to those used to prepare a TPOAC acid.

The dispersant which is a phosphate ester of Formula 8 is obtainable by reacting a TPOAC alcohol with a phosphating agent wherein the ratio of the alcohol to each phosphorus atom of the phosphating agent is from 3:1 to 1:1 and especially from 2:1 to 1:1. It is especially preferred that the ratio of each TPOAC alcohol to each phosphorus atom of the phosphating agent is less than 2, for example, about 1.5:1 when the dispersant is a mixture of mono and di-phosphate esters.

The reaction between the TPOAC alcohol and phosphating agent is preferably carried out in an inert atmosphere such as nitrogen under anhydrous conditions. The reaction may be carried out in an inert solvent but is more convenient to react the TPOAC alcohol with the phosphating agent in the absence of a solvent. The reaction temperature is preferably above 60 and especially above 80° C. In order to avoid charring the dispersant, the temperature is preferably less than 120 and especially less than 100° C.

As a less preferred variant, the dispersant of Formula 8 may also be prepared by reacting a monohydric alcohol with a preformed POAC acid and subsequently reacting the TPOAC alcohol with a phosphating or sulphating reagent.

The dispersants of the second aspect of the invention may contain additional ester, amide or amine salt groups formed by reacting the dispersant bearing an acidic group with an alcohol or alkanolamine.

The dispersants of the second aspect of the invention may be in the form of a free acid or it may form a salt with an alkali metal, ammonia, an amine, alkanolamine or quaternary ammonium salt. The dispersant of the second aspect of the invention is preferably in the form of a salt with an amine. Examples of suitable amines are n-butylamine, diethanolamine and dimethylaminopropylamine.

The dispersant of the first aspect of the invention may also be in the form of a salt with a coloured acid. By the term "coloured acid" is meant an organic pigment or dyestuff containing at least one, preferably from 1 to 6 acid groups, especially sulphonic, phosphonic or carboxylic acid groups. A preferred coloured acid is copper phthalocyanine or other deeply coloured pigment and especially sulphonated copper phthalocyanine containing, on average, from 0.5 to 3 sulphonic acid groups per molecule.

Many of the intermediates used in the preparation of the dispersants according to the invention are novel, especially the TPOAC acid used to make dispersants of the first aspect of the invention and the TPOAC alcohol used to make the preferred dispersants of the second aspect of the invention.

Thus, according to the invention there is provided a TPOAC acid of Formula 12

$$T-(O-V-VO)_{n+p}-OH \qquad (12)$$

and a TPOAC alcohol of Formula 13

$$D^1-J-(CO-V-O)_{n+p}H \qquad (13)$$

wherein
T, V, $D^1$, J, n and p are as defined hereinbefore.

As noted hereinbefore, the dispersants are particularly useful for dispersing a particulate solid in an organic medium.

According to a further aspect of the invention there is provided a composition comprising a particulate solid and a dispersant of Formula 1.

According to a still further aspect of the invention there is provided a dispersion comprising a dispersant of Formula 1, a particulate solid and an organic medium.

The solid present in the dispersion may be any inorganic or organic solid material which is substantially insoluble in the organic medium at the temperature concerned and which it is desired to stabilise in a finely divided form therein.

Examples of suitable solids are pigments for solvent inks; pigments, extenders and fillers for paints and plastics materials; dyes, especially disperse dyes; optical brightening agents and textile auxiliaries for solvent dyebaths, inks and other solvent application systems; solids for oil-based and invert-emulsion drilling muds; dirt and solid particles in dry cleaning fluids; particulate ceramic materials; magnetic materials and magnetic recording media, and biocides, agrochemicals and pharmaceuticals which are applied as dispersions in organic media.

A preferred solid is a pigment from any of the recognised classes of pigments described, for example, in the Third Edition of the Colour Index (1971) and subsequent revisions of, and supplements thereto, under the chapter headed "Pigments". Examples of inorganic pigments are titanium dioxide, zinc oxide, Prussian blue, cadmium sulphide, iron oxides, vermilion, ultramarine and the chrome pigments, including chromates, molybdates and mixed chromates and sulphates of lead, zinc, barium, calcium and mixtures and modifications thereof which are commercially available as greenish-yellow to red pigments under the names primrose, lemon, middle, orange, scarlet and red chromes. Examples of organic pigments are those from the azo, disazo, condensed azo, thioindigo, indanthrone, isoindanthrone, anthanthrone, anthraquinone, isodibenzanthrone, triphendioxazine, quinacridone and phthalocyanine series, especially copper phthalocyanine and its nuclear halogenated derivatives, and also lakes of acid, basic and mordant dyes. Carbon black, although strictly inorganic, behaves more like an organic pigment in its dispersing properties. Preferred organic pigments are phthalocyanines, especially copper phthalocyanines, monoazos, disazos, indanthrones, anthranthrones, quinacridones and carbon blacks.

Other preferred solids are: extenders and fillers such as talc, kaolin, silica, barytes and chalk; particulate ceramic materials such as alumina, silica, zirconia, titania, silicon nitride, boron nitride, silicon carbide, boron carbide, mixed silicon-aluminium nitrides and metal titanates; particulate magnetic materials such as the magnetic oxides of transition metals, especially iron and chromium, e.g. gamma-$Fe_2O_3$, $Fe_3O_4$, and cobalt-doped iron oxides, calcium oxide, ferrites, especially barium ferrites; and metal particles, especially metallic iron, nickel, cobalt and alloys thereof; and agrochemicals such as the fungicides flutriafen, carbendazim, chlorothalonil and mancozeb.

The organic medium present in the dispersions of the invention is preferably a polar organic medium or a substantially non-polar aromatic hydrocarbon or halogenated hydrocarbon. By the term "polar" in relation to the organic medium is meant an organic liquid or resin capable of forming moderate to strong bonds as described in the article entitled "A Three Dimensional Approach to Solubility" by Crowley et al in Journal of Paint Technology, Vol. 38, 1966, at page 269. Such organic media generally have a hydrogen bonding number of 5 or more as defined in the abovementioned article.

Examples of suitable polar organic liquids are amines, ethers, especially lower alkyl ethers, organic acids, esters, ketones, glycols, alcohols and amides. Numerous specific examples of such moderately strongly hydrogen bonding liquids are given in the book entitled "Compatibility and Solubility" by Ibert Mellan (published in 1968 by Noyes Development Corporation) in Table 2.14 on pages 39–40 and these liquids all fall within the scope of the term polar organic liquid as used herein.

Preferred polar organic liquids are dialkyl ketones, alkyl esters of alkane carboxylic acids and alkanols, especially such liquids containing up to, and including, a total of 6 carbon atoms. As examples of the preferred and especially preferred liquids there may be mentioned dialkyl and cycloalkyl ketones, such as acetone, methyl ethyl ketone, diethyl ketone, di-isopropyl ketone, methyl isobutyl ketone, di-isobutyl ketone, methyl isoamyl ketone, methyl n-amyl ketone and cyclohexanone; alkyl esters such as methyl acetate, ethyl acetate, isopropyl acetate, butyl acetate, ethyl formate, methyl propionate, methoxy propylacetate and ethyl butyrate; glycols and glycol esters and ethers, such as ethylene glycol, 2-ethoxyethanol, 3-methoxypropylpropanol, 3-ethoxypropylpropanol, 2-butoxyethyl acetate, 3-methoxypropyl acetate, 3-ethoxypropyl acetate and 2-ethoxyethyl acetate; alkanols such as methanol, ethanol, n-propanol, isopropanol, n-butanol and isobutanol and dialkyl and cyclic ethers such as diethyl ether and tetrahydrofuran.

The substantially non-polar, organic liquids which may be used, either alone or in admixture with the aforementioned polar solvents, are aromatic hydrocarbons, such as toluene and xylene, and halogenated aliphatic and aromatic hydrocarbons, such as trichloro-ethylene, perchloroethylene and chlorobenzene.

Examples of suitable polar resins, as the medium for the dispersion form of the present invention, are film-forming resins such as are suitable for the preparation of inks, paints and chips for use in various applications such as paints and inks. Examples of such resins include polyamides, such as Versamid™ and Wolfamid™, and cellulose ethers, such as ethyl cellulose and ethyl hydroxyethyl cellulose. Examples of paint resins include short oil alkyd/melamine-formaldehyde, polyester/melamine-formaldehyde, thermosetting acrylic/melamine-formaldehyde, long oil alkyd and multi-media resins such as acrylic and urea/aldehyde.

If desired, the dispersions may contain other ingredients, for example resins (where these do not already constitute the organic medium) binders, fluidising agents (such as those described in GB-A-1508576 and GB-A-2108143), anti-sedimentation agents, plasticisers, levelling agents and preservatives.

The dispersions typically contain from 5 to 95% by weight of the solid, the precise quantity depending on the nature of the solid and the quantity depending on the nature of the solid and the relative densities of the solid and the organic medium. For example, a dispersion in which the solid is an organic material, such as an organic pigment, preferably contains from 15 to 60% by weight of the solid whereas a dispersion in which the solid is an inorganic material, such as an inorganic pigment, filler or extender, preferably contains from 40 to 90% by weight of the solid based on the total weight of dispersion.

The dispersion may be obtained by any of the conventional methods known for preparing dispersions. Thus, the solid, the organic medium and the dispersant may be mixed in any order, the mixture then being subjected to a mechanical treatment to reduce the particles of the solid to an appropriate size, for example by ball milling, bead milling, gravel milling or plastic milling until the dispersion is formed. Alternatively, the solid may be treated to reduce its particle size independently or in admixture with either the organic medium or the dispersant, the other ingredient or ingredients then being added and the mixture being agitated to provide the dispersion.

If the composition is required in dry form, the liquid medium is preferably volatile so that it may be readily removed from the particulate solid by a simple separation means such as evaporation. It is preferred, however, that the dispersion comprises the liquid medium.

If the dry composition consists essentially of the dispersant and the particulate solid, it preferably contains at least 0.2%, more preferably at least 0.5% and especially at least 1.0% dispersant based on weight of the particulate solid. Preferably the dry composition contains not greater than 100%, preferably not greater than 50%, more preferably not greater than 20% and especially not greater than 10% by weight based on the weight of the particulate solid.

As described hereinbefore, the dispersants of the invention are particularly suitable for preparing mill-bases where the particulate solid is milled in a liquid medium in the presence of both a particulate solid and a film-forming resin binder.

Thus, according to a still further aspect of the invention there is provided a mill-base comprising a particulate solid, dispersant and a film-forming resin.

Typically, the mill-base contains from 20 to 70% by weight particulate solid based on the total weight of the mill-base. Preferably, the particulate solid is not less than 30 and especially not less than 50% by weight of the mill-base.

The amount of resin in the mill-base can vary over wide limits but is preferably not less than 10%, and especially not less than 20% by weight of the continuous/liquid phase of the mill-base. Preferably, the amount of resin is not greater than 50% and especially not greater than 40% by weight of the continuous/liquid phase of the mill-base.

The amount of dispersant in the mill-base is dependent on the amount of particulate solid but is preferably from 0.5 to 5% by weight of the mill-base.

Dispersions and mill bases containing the dispersants of the invention are particularly suitable for use in paints, especially high solids paints, inks, especially flexographic, gravure and screen inks, and non-aqueous ceramic processes, especially tape-coating, doctor-blade, extrusion and injection moulding type processes.

The dispersants of the present invention exhibit advantage over known dispersants derived from $\epsilon$-caprolactone. In particular, they exhibit superior solubility in organic media such as solvents and do not separate or crystallise when stored at 4° C. for lengthy periods. When stored at low temperatures, separation can occur at −24° C. but the dispersants readily re-dissolve on warming to 4–10° C. When incorporated into paints and painting inks, the dispersants of the present invention give rise to higher gloss readings and lower haze values in the resultant paints and inks.

The invention is further illustrated by the following examples wherein all references to amounts are in parts by weight unless indicated to the contrary.

EXAMPLES

Preparation of alkyl ε-caprolactone intermediates
Lactone 1 4- and 6-methyl ε-caprolactone 3-methylcyclohexanone (10 parts, 0.089M ex. Aldrich) was dissolved in dichloromethane (400 ml) and sodium bicarbonate (37 parts) added, portionwise, with vigorous stirring at 18–20° C. under a nitrogen atmosphere. A suspension of 3-chloroperoxybenzoic acid (24.17 parts, 0.098M ex. Fluka) in dichloromethane (100 ml) was then added over 10 minutes with external cooling to maintain a temperature below 20° C. and the reaction continued at 18–20° C. by stirring for a further 4 hours. The reaction mix was then shaken with a 10% aqueous solution of sodium sulphite (2×250 ml) followed by water (2×250 ml) and then dried over anhydrous magnesium sulphate. After evaporating the solvent a mixture of 4- and 6-methyl ε-caprolactone was obtained as a thin yellow oil (8 parts).

Lactone 2 3- and 7-methyl ε-caprolactone

This was prepared in the same manner as that described for Lactone 1 except using the same weight of 2-methylcyclohexanone (ex. Aldrich) in place of 3-methylcyclohexanone. The product was obtained as a clear oil (8 parts) and is mainly 7-methyl ε-caprolactone (95%).

Lactone 3 5-methyl ε-caprolactone

This was prepared in similar manner to Lactone 1 except using 4-methyl cyclohexanone (50 parts; 0.445m ex. Aldrich) in place of the 3-methylcyclohexanone with appropriate increase in the dichloromethane (1500 ml), sodium bicarbonate (8.1 parts, 1.0 M) and 3-chloroperoxybenzoic acid (123 parts; 0.5 M). The reaction temperature was maintained below 10° C. throughout. The 5-methyl ε-caprolactone was obtained as a clear yellow oil (49 parts).

Lactone 4 5-tertbutyl ε-caprolactone

This was prepared in the same manner as Lactone 1 except using 4-tert butylcyclohexanone (10 parts, 0.065 m ex. Aldrich), 3-chloroperoxybenzoic acid (17.5 parts, 0.0713M), sodium bicarbonate (11.5 parts, 0.143M) and dichloromethane (750 ml) in place of the 3-methyl cyclohexanone and amounts described for Lactone 1. The product was obtained as an oil (10.2 parts).

Lactone 5 4,6,6- and 4,4,6-trimethyl ε-caprolactone 3,3,5-Trimethylcyclohexanone (10 parts, 0.071M ex. Fluka) was dissolved in dichloromethane (200 ml). 3-chloroperoxybenzoic add (30.6 parts, 0.142M) was added, portionwise, with stirring and the reaction mix cooled externally below 5° C. Trifluoroacetic acid (8 parts, 0.071M ex. Fluka) was added dropwise over 30 minutes with stirring at 0–5° C. and the reactants stirred for a further 20 hours allowing the temperature to rise to 18–20° C.

The reaction mass was then poured into a 10% w/w aqueous solution of sodium sulphite (50 ml) and allowed to stand. The solvent layer was separated and shaken with 10% aqueous sodium sulphite (2×50 ml), 10% w/w aqueous potassium carbonate (3×50 ml) and water (2×50 ml). Finally, the solvent phase was dried over anhydrous sodium sulphate and the solvent evaporated. The product was obtained as a clear colourless oil (11 parts).

Preparation of Intermediates

In the title of the intermediates the components of the POAC chain and polymerisation terminal group is indicated. The figures following the component identity indicate the ratio of the components by weight. Thus, Intermediate 1 contains lauric acid (1), ε-caprolactone (8) and 7-methyl ε-caprolactone (4).

Example 1

LA 1, ε-cap 8, 7-Me ε-cap 4

Lauric acid (LA, 10 parts, 0.049M ex. Aldrich), ε-caprolactone (ε-cap, 44.7 parts, 0.392M ex. Adlrich) and 7-methyl-ε-caprolactone (7-Me ε-cap, 25 parts, 0.196M, Lactone 2) were stirred under a nitrogen atmosphere and heated to 100° C. Zirconium isopropoxide (0.45 part ex. Aldrich) was added and the reactants heated to 175–180° C. The reaction was continued with stirring at this temperature under nitrogen for a further 6 hours. After cooling, the product was obtained as a brown oil (76 parts). This is Intermediate 1.

Example 2

LA 1, ε-cap 12, 7-Me ε-cap 6

This was prepared in the same manner as Intermediate 1 except using 68 parts ε-caprolactone (0.58M) and 37.6 parts 7-methyl ε-caprolactone (0.294M) in place of the amounts given in Example 1. The product, Intermediate 2, was obtained as a pale brown oil (112 parts).

Example 3

LA 1, ε-cap 12, 7-Me ε-cap 4

This was prepared in the same manner as Intermediate 2 except using 25 parts 7-methyl ε-caprolactone (0.196M) in place of the amount given in Example 2. The product, Intermediate 3, was obtained as a brown gum (101 parts).

Example 4

LA 1, ε-cap 12, 7-Me ε-cap 3

This was prepared in the same manner as Intermediate 2 except using 18.8 parts 7-methyl ε-caprolactone (0.147M) in place of the amount given in Example 2. The product, Intermediate 4, was obtained as a brown gum (92 parts).

Examples 5 to 17

The Intermediates listed in Table 1 below were prepared by the same method used to prepare Intermediate 1. The figures in the columns of the table indicate the molar ratio of the components lauric acid, ε-caprolactone and alkyl substituted ε-caprolactone.

TABLE 1

| Example/Intermediate | Lactone | LA | ε-cap | alkyl ε-cap | | Appearance |
|---|---|---|---|---|---|---|
| 5 | 1 | 1 | 12 | 6 | 4-Me | Clear brown oil |
| 6 | 1 | 1 | 8 | 4 | 4-Me | Brown solid |
| 7 | 1 | 1 | 12 | 3 | 4-Me | Brown solid |
| 8 | 1 | 1 | 12 | 4 | 4-Me | Brown solid |
| 9 | 3 | 1 | 12 | 6 | 5-Me | Clear brown oil |
| 10 | 3 | 1 | 12 | 3 | 5-Me | Brown gum |

TABLE 1-continued

| Example/Intermediate | Lactone | LA | ε-cap | alkyl ε-cap | | Appearance |
|---|---|---|---|---|---|---|
| 11 | 3 | 1 | 12 | 4 | 5-Me | Brown liquid |
| 12 | 4 | 1 | 8 | 4 | 5-tert Bu | Brown liquid |
| 13 | 4 | 1 | 12 | 3 | 5-tert Bu | Thick brown oil |
| 14 | 4 | 1 | 12 | 4 | 5-tert Bu | Brown gum |
| 15 | 5 | 1 | 12 | 6 | tri Me | Brown gum |
| 16 | 5 | 1 | 12 | 4 | tri Me | Brown gum |
| 17 | 5 | 1 | 12 | 3 | tri Me | Brown gum |

Footnote to Table 1.
LA is lauric acid.
ε-cap is ε-caprolactone.
alkyl ε-cap is alkyl substituted ε-caprolactone where the first figure indicates molar amount relative to LA and ε-cap and the second figure indicates position of the alkyl substituent.
tri Me is a mixture of 4,4,6-trimethyl- and 4,6,6-trimethyl-ε-caprolactone (Lactone 5).

Example 18

LA 1, ε-cap 12, δ-val 6

Lauric acid (10 parts, 0.049 m ex. Aldrich), ε-caprolactone (67 parts, 0.58M ex. Alrich) and δ-valerolactone (29.4 parts, 0.294M ex. Aldrich) were stirred under nitrogen and heated to 100-5° C. zirconium isopropoxide (0.45 parts ex. Aldrich) was added and temperature raised to 170-5° C. The reactants were stirred under nitrogen at this temperature for a further 6 hours. On cooling, the product (Intermediate 18) was obtained as a yellow oil (105 parts).

Examples 19 to 22

The Intermediates listed in Table 2 below were prepared by the same method as that described in the preparation of Intermediate 18 except varying the relative molar proportions of the reactants as indicated in Table 2.

TABLE 2

| Example/Intermediate | LA | ε-cap | δ-val | Appearance |
|---|---|---|---|---|
| 19 | 1 | 12 | 3 | Brown solid |
| 20 | 1 | 12 | 4 | Soft white solid |
| 21 | 1 | 8 | 8 | Brown gum |
| 22 | 1 | 12 | 2 | Off-white solid |

Footnote to Table 2
LA and ε-cap are as described in the footnote to Table 1
δ-val is δ-valerolactone.

Example 23

LA 1, 7-Me ε-cap 11

Lauric acid (10 parts, 0.49M ex. Aldrich) and 7-methyl ε-caprolactone (69 parts, Lactone 2) were stirred under nitrogen at 100-5° C. Zirconium isopropoxide (0.45 parts ex. Aldrich) was added and the temperature raised to 175–180° C. and the reaction continued at this temperature for a further 6 hours. On cooling, the product (Intermediate 23) was obtained as a viscous yellow oil (75 parts). The molar ratio of lauric acid to 7-methyl ε-caprolactone was 1:11.

Examples 24 to 29

The intermediates listed in Table 3 below were prepared using a similar method to that described in Example 23 above using the lactones indicated and the molar ratio of lauric acid the alkyl ε caprolactone as listed in the Table.

TABLE 3

| Example/Intermediate | Lactone | LA | alkyl ε-cap | | Appearance |
|---|---|---|---|---|---|
| 24 | 1 | 1 | 11 | 4-Me | Dark brown oil |
| 25 | 3 | 1 | 11 | 5-Me | Brown oil |
| 26 | 4 | 1 | 10 | 5-t BU | Brown oil |
| 27 | 2 | 1 | 14 | 7-Me | Thick yellow oil |
| 28 | 3 | 1 | 14 | 5-Me | Brown oil |
| 29 | 1 | 1 | 14 | 4-Me | Brown liquid |

Footnote to Table 3
LA and alkyl ε-cap are as explained in the footnote to Table 1

Preparation of Dispersants

Example 30

(LA 1, ε-cap 8, 7-Me ε-cap 4) PEI 1

Intermediate 1 (52 parts) and PEI (4 parts ex. Nippon Shokubai, approx. MW 10,000) were heated with stirring at 120–125° C. under nitrogen for 6 hours. The weight ratio of PEI to the terminal capped poly(oxyalkylene carbonyl) acid (TPOAC acid) was 1:13. On cooling, the product (Dispersant 1) was obtained as a brown liquid (54.1 parts).

Examples 31 to 46

The Dispersants listed in Table 4 below were prepared in identical manner to Dispersant 1 in Example 30 except replacing Intermediate 1 with the same amounts of Intermediates indicated in the table. In these Dispersants the weight ratio of PEI to TPOAC acid was maintained at 1:13 and the MW of the PEI was approximately 10,000.

TABLE 4

| Example | Dispersant | Intermediate | Structure | Appearance |
|---|---|---|---|---|
| 32 | 2 | 5 | (LA 1, ε-cap 12, 4-Me 6) PEI 1 | Thick brown liquid |
| 33 | 3 | 9 | (LA 1, ε-cap 12, 5-Me 6) PEI 1 | Thick brown liquid |
| 34 | 4 | 12 | (LA 1, ε-cap 8, 5-t Bu 4) PEI 1 | Thick brown liquid |
| 35 | 5 | 2 | (LA 1, ε-cap 12, 7-Me 6) PEI 1 | Brown gum |
| 36 | 6 | 4 | (LA 1, ε-cap 12, 7-Me 3) PEI 1 | Thick brown oil |
| 37 | 7 | 10 | (LA 1, ε-cap 12, 5-Me 3) PEI 1 | Clear brown thick liquid |
| 38 | 8 | 6 | (LA 1, ε-cap 8, 4-Me 4) PEI 1 | Brown gum |
| 39 | 9 | 3 | (LA 1, ε-cap 12, 7-Me 4) PEI 1 | Brown gum |
| 40 | 10 | 13 | (LA 1, ε-cap 12, 5-t Bu 3) PEI 1 | Thick brown gum |
| 41 | 11 | 7 | (LA 1, ε-cap 12, 4-Me 3) PEI 1 | Brown solid |
| 42 | 12 | 8 | (LA 1, ε-cap 12, 4-Me 4) PEI 1 | Brown solid |
| 43 | 13 | 11 | (LA 1, ε-cap 12, 5-Me 4) PEI 1 | Brown gum |

TABLE 4-continued

| Example | Dispersant | Intermediate | Structure | Appearance |
|---|---|---|---|---|
| 44 | 14 | 15 | (LA 1, ϵ-cap 12, tri Me 6) PEI 1 | Brown gum |
| 45 | 15 | 16 | (LA 1, ϵ-cap 12, tri Me 4) PEI 1 | Brown gum |
| 46 | 16 | 17 | (LA 1, ϵ-cap 12, tri Me 4) PEI 1 | Yellow solid |

Footnote to Table 4
LA, ϵ-cap, alkyl ϵ cap and tri Me are as described in the footnote to Table 1.

Example 47

(LA 1, ϵ-cap 12, 5-t Bu, ϵ-cap 4) PEI 1

This was prepared in the same manner as Dispersant 1 of Example 30 except using Intermediate 14 (39 parts) and PEI (3 parts) in place of Intermediate 1 and the amounts used in Example 23. Again the weight ratio of PEI to TPOAC acid was 1:13. The product, Dispersant 17, was obtained as a brown gum (40 parts).

Example 48

(LA 1, ϵ-cap 12, δ-val 6) PEI 1

Intermediate 18 (78 parts) and polyethyleneimine (6 parts ex. Nippon Shokubai, approx. MW 10,000) were stirred under nitrogen and heated to 120° C. The reaction was continued at 120° C. for a further 6 hours. On cooling, the product was obtained as a pale brown oil (76 parts). This is Dispersant 18. The weight ratio of TPOAC acid to PEI is 13:1.

Examples 49 to 52

Example 40 was repeated using the Intermediates listed in Table 5 below to obtain the Dispersants indicated where the weight ratio of TPOAC to PEI was maintained at 13:1 and the approximate MW of PEI was 10,000.

TABLE 5

| Example | Dispersant | Intermediate | Structure | Appearance |
|---|---|---|---|---|
| 49 | 19 | 19 | (LA 1, ϵ-cap 12, δ-val 3) PEI 1 | Soft brown solid |
| 50 | 20 | 20 | (LA 1, ϵ-cap 12, δ-val 4) PEI 1 | Brown gum |
| 51 | 21 | 21 | (LA 1, ϵ-cap 8, δ-val 8) PEI 1 | Brown gum |
| 52 | 22 | 22 | (LA 1, ϵ-cap 12, δ-val 2) PEI 1 | Brown gum |

Example 53

(LA, 1, 7-Me ϵ-cap 11) PEI 1

Intermediate 23 (52 parts) and PEI (4 parts ex. Nippon Shokubai, approx. MW 10,000) were heated under nitrogen at 120-5° C. for 6 hours. On cooling, the product was obtained as a clear brown oil (53.4 parts). This is Dispersant 23. The weight ratio of PEI to TPOAC acid is 1:13.

Examples 54 to 59

The dispersants listed in Table 6 below were prepared by the manner described in Example 53 above except using the Intermediate indicated. The weight ratio of PEI to TROAC acid was maintained at 1:13.

TABLE 6

| Example | Dispersant | Intermediate | Structure | Appearance |
|---|---|---|---|---|
| 54 | 24 | 24 | (LA 1, 4-Me ϵ-cap 11) PEI 1 | Thick brown oil |
| 55 | 25 | 25 | (LA 1, 5-Me ϵ-cap 11) PEI 1 | Brown liquid |
| 56 | 26 | 26 | (LA 1, 5-t Bu ϵ-cap 10) PEI 1 | Brown gel |
| 57 | 27 | 27 | (LA 1, 7-Me ϵ-cap 14) PEI 1 | Clear brown oil |
| 58 | 28 | 28 | (LA 1, 5-Me ϵ-cap 14) PEI | Brown oil |
| 59 | 29 | 29 | (LA 1, 4-Me ϵ-cap 14) PEI 1 | Brown gum |

Footnote to Table 6
The numbers following LA and ϵ-cap indicate molar ratio of LA to alkyl ϵ-cap.

Examples 60 to 68

Each of the Dispersants (2 parts) indicated in Table 7 below was added to a 8 dram vial and a 4:1 mixture of methoxy propylacetatelbutan-l-ol (10 ml) added. The vial was sealed and the dispersant dissolved by shaking with heat as necessary. The dispersant solutions were then stored for 72 hours at 4° C. and 7 days at −25° C. and examined for separation/crystallisation.

TABLE 7

| Example | Dispersant | Structure | 72 hours at 4° C. | 7 days at −25° C. |
|---|---|---|---|---|
| 60 | 23 | (LA 1, 7-Me 11) | No | No |
| 61 | 27 | (LA 1, 7-Me 14) | No | No |
| 62 | 25 | (LA 1, 5-Me 11) | No | No |
| 63 | 28 | (LA 1, 5-Me 14) | No | No |
| 64 | 24 | (LA 1, 4-Me 11) | No | No |
| 65 | 2 | (LA 1, ϵ-cap 8, 7-Me 4) | No | No |
| 66 | 1 | (LA 1, ϵ-cap 12, 4-Me 6) | No | sl |
| 67 | 3 | (LA 1, ϵ-cap 12, 5-Me 6) | No | sl |
| 68 | 4 | (LA 1, ϵ-cap 8, 5-t Bu 4) | No | No |
| Control | | | Yes | Yes |

Footnote to Table 7
Control is ϵ-caprolactone polymerised in the presence of lauric acid and reacted with PEI (MW 10,000).
ϵ-cap is ϵ-caprolactone.
LA is lauric acid.
sl is slight precipitate.
Substituted alkyl ϵ-caprolactone is indicated only by the substituent e.g. 7-Me is 7-Me ϵ-caprolactone.

The figures following LA ϵ-cap and alkyl ϵ-cap indicate the molar ratio of the components of the TPOAC. All the TPOAC acids are reacted with PEI (MW 10,000) in the weight ratio 13:1.

Examples 69 to 80

Examples 60 to 68 were repeated except that the dispersant solution was examined after storage at 4° C. for 24 and 48 hours and also 1 week. The results are given in Table 8 below:

TABLE 8

| Example | Dispersant | Structure | Storage at 4° C. | | | |
|---|---|---|---|---|---|---|
| | | | 24 hrs | 48 hrs | 7 days | 24 hours at -25° C. |
| 69 | 5 | (LA 1, ε-cap 12, 7-Me 6) | No | No | No | No |
| 70 | 6 | (LA 1, ε-cap 12, 7-Me 3) | No | No | No | No |
| 71 | 7 | (LA 1, ε-cap 12, 5-Me 3) | No | No | No | No |
| 72 | 8 | (LA 1, ε-cap 8, 4-Me 4) | No | No | No | No |
| 73 | 9 | (LA 1, ε-cap 12, 7-Me 4) | No | No | No | No |
| 74 | 10 | (LA 1, ε-cap 12, 5-t Bu 3) | No | No | No | No |
| 75 | 11 | (LA 1, ε-cap 12, 4-Me 3) | No | No | No | No |
| 76 | 12 | (LA 1, ε-cap 12, 4-Me 4) | No | No | No | No |
| 77 | 17 | (LA 1, ε-cap 12, 5-t Bu 4) | No | No | No | Cloudy |
| 78 | 13 | (LA 1, ε-cap 12, 5-Me 4) | No | No | No | No |
| 79 | 26 | (LA 1, 5-t Bu 10) | No | No | No | No |
| 80 | 29 | (LA 1, 4-Me 14) | No | No | No | No |
| Control | | | Yes | Yes | Yes | Yes |

Footnote to Table 8
Control and interpretation of structure of dispersant is as described in the footnote to Table 7.

Examples 81 to 87

Examples 60 to 68 were repeated using the dispersants listed in Table 9 below and the solution stability determined after storage for 24 hours at 4° C. and after 48 hours at -25° C.

TABLE 9

| Example | Dispersant | Structure | 24 hours at 4° C. | 48 hours at -25° C. |
|---|---|---|---|---|
| 81 | 14 | (LA 1, ε-cap 12, tri-Me 6) | No | No |
| 82 | 15 | (LA 1, ε-cap 12, tri-Me 4) | No | No |
| 83 | 16 | (LA 1, ε-cap 12, tri-Me 3) | No | Yes |
| 84 | 18 | (LA 1, ε-cap 12, δ-val 6) | No | Yes |
| 85 | 21 | (LA 1, ε-cap 8, δ-val 8) | No | No |
| 86 | 19 | (LA 1, ε-cap 12, δ-val 3) | No | No |
| 87 | 22 | (LA 1, ε-cap 12, δ-val 2) | No | No |
| Control | | | Yes | Yes |

Footnote to Table 9
LA, control, ε-cap and the alkyl substituted ε-cap are as explained in the footnote to Table 7.
δ-val is δ-valerolactone.

Examples 88 to 116

The Dispersant (0.45 parts) listed in Table 10 below was dissolved in a 4:1 mixture methoxy propylacetate/butan-1-ol (7.55 parts) in a 8 dram glass vial. Glass beads (3 mm, 17 parts) and Monolite Rubine 3B (2 parts) were added and the vials were sealed and shaken on a horizontal shaker for 16 hours. The resulting dispersion was then assessed for fluidity using an arbitrary scale of A to E (good to bad).

TABLE 10

| Example | Dispersant | Structure | Fluidity |
|---|---|---|---|
| 88 | 23 | (LA 1, 7-Me 11) | B |
| 89 | 27 | (LA 1, 7-Me 14) | B/C |
| 90 | 25 | (LA 1, 5-Me 11) | C/D |
| 91 | 28 | (LA 1, 5-Me 14) | B |
| 92 | 24 | (LA 1, 4-Me 11) | D |
| 93 | 1 | (LA 1, ε-cap 8, 7-Me 4) | B |
| 94 | 2 | (LA 1, ε-cap 12, 4-Me 6) | A/B |
| 95 | 3 | (LA 1, ε-cap 12, 5t-Me 6) | A |
| 96 | 4 | (LA 1, ε-cap 8, 5t-Bu 4) | B/C |
| 97 | 5 | (LA 1, ε-cap 12, 7-Me 6) | A |
| 98 | 6 | (LA 1, ε-cap 12, 7-Me 3) | A |
| 99 | 7 | (LA 1, ε-cap 12, 5-Me 3) | B |
| 100 | 8 | (LA 1, ε-cap 8, 4-Me 4) | A/B |
| 101 | 9 | (LA 1, ε-cap 12, 7-Me 4) | A/B |
| 102 | 10 | (LA 1, ε-cap 12, 5-t Bu 3) | A/B |
| 103 | 11 | (LA 1, ε-cap 12, 4-Me 3) | A/B |
| 104 | 12 | (LA 1, ε-cap 12, 4-Me 4) | A |
| 105 | 17 | (LA 1, ε-cap 12, 5-t Bu 4) | B |
| 106 | 13 | (LA 1, ε-cap 12, 5-Me 4) | A |
| 107 | 26 | (LA 1, 5-t Bu 10) | D/E |
| 108 | 29 | (LA 1, 4-Me 14) | C/D |
| 109 | 14 | (LA 1, ε-cap 12, tri-Me 6) | D |
| 110 | 15 | (LA 1, ε-cap 12, tri-Me 4) | C/D |
| 111 | 16 | (LA 1, ε-cap 12, tri-Me 3) | C |
| 112 | 18 | (LA 1, ε-cap 12, δ-val 6) | A/B |
| 113 | 19 | (LA 1, ε-cap 12, δ-val 3) | A |
| 114 | 20 | (LA 1, ε-cap 12, δ-val 4) | A |
| 115 | 21 | (LA 1, ε-cap 8, δ-val 8) | C/D |
| 116 | 22 | (LA 1, ε-cap 12, δ-val 2) | A/B |
| Control | | | B |

Footnote to Table 10
Interpretation of structure of dispersant is as explained in the footnotes to Tables 7 and 9.

Examples 117 to 139

Table 11 below describes Dispersants 30 to 52 which are the reaction product of PEI (MW 10,000) with an alkyl end-capped copolymer of ε-caprolactone and alkyl substituted ε-caprolactone or a copolymer of ε-caprolactone and δ-valerolactone. In the table, in numeric values under columns headed ε-cap, alkyl-ε-cap and δ-val are the molar ratios of the acid used to end-cap the copolymer, ε-caprolactone and alkyl substituted ε-caprolactone/δ-valerolactone, respectively. In all cases the relative molar amount of acid used to end-cap the copolymer is unity. The ratio of the intermediate copolymer to PEI in the last column of Table 11 is parts by weight.

Intermediates 30 to 41 derived from alkyl substituted ε-caprolactone were made by an analogous process to that described in Example 1 using the lactones indicated and replacing the lauric acid by the molar equivalent of the acid indicated in Table 11. Intermediates 30 to 41 derived from δ-valerolactone were made by an analogous process described in Example 18.

Dispersants 30 to 52 were made by a similar process to that described in Example 30 using the intermediate indicated in Table 11 and reacting with PEI (MW 10,000; Epomin SP 200 ex. Nippon Shokubai). The weight ratio of intermediate to PEI is as indicated in Table 11. All dispersants were obtained as a brown gum.

TABLE 11

| Ex. | Dispersant | Intermediate No. | End Acid | ε-cap | alkyl | ε-cap | δ-val | Ratio of Intermediate to PEI (10,000) |
|---|---|---|---|---|---|---|---|---|
| 117 | 30 | 7 | LA | 12 | 3 | 4-Me | — | 5:1 |
| 118 | 31 | 30 | STA | 12 | 3 | 5-Me | — | 22:1 |
| 119 | 32 | 31 | MAA | 12 | 3 | tri Me | — | 22:1 |
| 120 | 33 | 19 | LA | 12 | — | — | 3 | 9:1 |
| 121 | 34 | 32 | LA | 12 | 4 | 5-Me | — | 17:1 |
| 122 | 35 | 33 | STA | 12 | 4 | 5-Me | — | 17:1 |
| 123 | 36 | 21 | LA | 8 | — | — | 8 | 9:1 |
| 124 | 37 | 8 | LA | 12 | 4 | 4-Me | — | 17:1 |
| 125 | 38 | 10 | LA | 12 | 3 | 5-Me | — | 5:1 |
| 126 | 39 | 34 | STA | 12 | 3 | 5-Me | — | 9:1 |
| 127 | 40 | 35 | STA | 12 | 4 | 5-Me | — | 9:1 |
| 128 | 41 | 36 | STA | 12 | 4 | 5-Me | — | 22:1 |
| 129 | 42 | 37 | MAA | 12 | 3 | tri Me | — | 17:1 |
| 130 | 43 | 2 | LA | 12 | 6 | 7-Me | — | 2:1 |
| 131 | 44 | 22 | LA | 12 | — | — | 2 | 9:1 |
| 132 | 45 | 19 | LA | 12 | — | — | 3 | 5:1 |
| 133 | 46 | 15 | LA | 12 | 6 | tri Me | — | 5:1 |
| 134 | 47 | 38 | MAA | 12 | 4 | 4-Me | — | 9:1 |
| 135 | 48 | 6 | LA | 8 | 4 | 4-Me | — | 12:1 |
| 136 | 49 | 39 | MAA | 12 | 4 | 4-Me | — | 5:1 |
| 137 | 50 | 40 | STA | 12 | 4 | 5-Me | — | 13:1 |
| 138 | 51 | 41 | STA | 12 | 4 | tri Me | — | 5:1 |
| 139 | 52 | 17 | LA | 12 | 3 | tri Me | — | 17:1 |

Footnote to Table 11
LA is lauric acid
STA is stearic acid
MAA is methoxy acetic acid
ε-cap is ε-caprolactone
δ-val is δ-valerolactone
alkyl ε-cap is alkyl substituted ε-caprolactone indicating the type and position of the substituent(s).

Examples 140 to 161

The dispersants indicated in Tables 12A and 12B below were used to prepare dispersions of Monolite Rubine 3B in identical manner to that described in Examples 88 to 116 and the fluidity of the dispersion assessed. The solubility of the dispersants was also assessed by dissolving 2 parts in a 4:1 mixture of methoxypropylacetate and n-butanol (10 parts) with warming as necessary. The samples were sealed and placed in a refrigerator for 48 hours at 4° C. and the solubility assessed. Samples were also placed in freezer at −25° C. for 48 hours and the solubility assessed both before and after allowing to return to 20° C. A clear solution is indicated by a tick and the presence of crystals is indicated by a cross in Tables 12A and 12B.

TABLE 12A

| | | | Solubility | | |
|---|---|---|---|---|---|
| Example | Dispersant | Fluidity | 4° C. | −25° C. | Thaw |
| 140 | 30 | A/B | ✓ | X | ✓ |
| 141 | 31 | B | ✓ | X | ✓ |
| 142 | 32 | B | ✓ | X | X |
| 143 | 33 | A | ✓ | X | ✓ |

TABLE 12A-continued

| | | | Solubility | | |
|---|---|---|---|---|---|
| Example | Dispersant | Fluidity | 4° C. | −25° C. | Thaw |
| 144 | 34 | A/B | ✓ | X | ✓ |
| 145 | 35 | B | ✓ | X | ✓ |
| 146 | 36 | A | ✓ | ✓ | ✓ |
| 147 | 37 | B | ✓ | X | X |
| 148 | 38 | A/B | ✓ | X | ✓ |
| 149 | 39 | A/B | ✓ | X | ✓ |
| 150 | 40 | A/B | ✓ | X | ✓ |
| 151 | 41 | B | ✓ | X | ✓ |
| Control | | B | | | |

TABLE 12B

| Example | Dispersant | Fluidity | Solubility 4° C. | Solubility −25° C. | Thaw |
|---|---|---|---|---|---|
| 152 | 43 | B/C | ✓ | ✓ | ✓ |
| 153 | 44 | A | ✓ | X | ✓ |
| 154 | 45 | A/B | ✓ | X | ✓ |
| 155 | 46 | A/B | ✓ | X | ✓ |
| 156 | 47 | A/B | ✓ | X | ✓ |
| 157 | 48 | B | ✓ | X | ✓ |
| 158 | 49 | A/B | ✓ | X | ✓ |
| 159 | 50 | B | ✓ | X | ✓ |
| 160 | 51 | B/C | ✓ | ✓ | ✓ |
| 161 | 52 | A/B | ✓ | X | X |
| Control | | A/B | | | |

Footnote to Tables 12A and 12B
Control is as explained in the footnote to Table 7.

Examples 162 to 166

The following examples relate to hydroxy alkyl end-capped dispersants. The dispersants listed in Table 13 were made from intermediates listed and using the molar ratios shown in an analogous manner to that described in Example 18. These intermediates were reacted with PEI (EPOMIN SP 200; MW 10,000) in the weight ratios shown in Table 14 to form the dispersant using a process analogous to that described in Example 30. All the dispersants were obtained as a dark viscous liquid except Dispersant 54 which was obtained as a dark solid. Intermediates 42 to 44 were obtained as dark oils.

TABLE 13

| | | Intermediate | TPOAC Structure Intermediate | | | Ratio of Intermediate to |
|---|---|---|---|---|---|---|
| Example | Dispersant | No. | End Acid | ε-cap | δ-val | PEI (10,000) |
| 162 | 53 | 42 | RA3 | 3 | 3 | 5:1 |
| 163 | 54 | 43 | RA3 | 1 | 2 | 13:1 |
| 164 | 55 | 44 | RA6 | 3 | 3 | 9:1 |
| 165 | 56 | 44 | RA6 | 3 | 3 | 5:1 |
| 166 | 57 | 42 | RA3 | 3 | 3 | 9:1 |

Footnote to Table 13
RA is ricinoleic acid
ε-cap is ε-caprolactone
δ-val is δ-valerolactone
The figures in the intermediate structure are molar ratios of the components.
The figures in the end PEI column are ratio by weight.

Examples 167 to 171

The fluidity of dispersions of Monolite Rubine 3B were assessed using Dispersants 53 to 57 in an identical manner to that described in Examples 88 to 116 and using the same arbitrary scale of assessment. The results are given in Table 14 below.

Solution stability was determined by dissolving the dispersant (2 parts) in a 4:1 mixture of methoxypropylacetate/n-butanol (8 parts) with heating as required. Solubility was assessed after cooling to 20° C. and also after storage at 4° C. for one week. The results are also recorded in Table 14 where crystalisation is indicated by a cross.

TABLE 14

| | | | Solubility | |
|---|---|---|---|---|
| Example | Dispersant | Fluidity | 20° C. | 4° C. (1 week) |
| 167 | 53 | C/D | ✓ | ✓ |
| 168 | 54 | C | ✓ | ✓ |
| 169 | 55 | B | ✓ | ✓ |
| 170 | 56 | B | ✓ | ✓ |
| 171 | 57 | B | ✓ | ✓ |
| Control 1 | | A | ✓ | X |
| Control 2 | — | | ✓ | ✓ |

Footnote to Table 14
Control 1 is as explained in the footnote to Table 7.
Control 2 is the reaction product of PEI (10,000) with a polymer derived from ε-caprolactone end-capped with ricinoleic acid.

Examples 172 to 179

These examples are dispersants having different alkyl end-capped copolymers which have been reacted with PEI of differing molecular weight. The structures of the intermediates used to make the dispersants are recorded in Table 15 wherein the molar amount of End Acid is unity and the molar amount of ε-caprolactone and either alkyl-substituted ε-caprolactone or δ-valerolactone is as indicated. The figures in the end column headed PEI ratio is the weight ratio of intermediate end-capped copolymer to PEI.

Intermediates 45, 46, 48 and 49 were prepared in analogous manner to that described in Example 1. Intermediate 47 was prepared in analogous manner to that described in Example 18. Dispersants 58, 61 and 63 to 65 were prepared in analogous manner to that described in Example 30 and Dispersants 59, 60 and 62 were prepared in analogous manner to that described in Example 48.

TABLE 15

| | | | | TPOAC Intermediate Structure | | | | | |
|---|---|---|---|---|---|---|---|---|---|
| Example | Dispersant | Intermediate no | End Acid | ε-cap | alkyl | ε-cap | δ-val | PEI | PEI ratio |
| 172 | 58 | 45 | LA | 8 | 4 | 5-t Bu | — | SP012 | 5:1 |
| 173 | 59 | 19 | LA | 12 | — | — | 3 | SP018 | 9:1 |
| 174 | 60 | 19 | LA | 12 | — | — | 3 | SP300 | 13:1 |
| 175 | 61 | 46 | HA | 12 | 3 | 7-Me | — | Polymin P | 15:1 |
| 176 | 62 | 47 | HA | 12 | — | — | 3 | P1050 | 17:1 |
| 177 | 63 | 46 | HA | 12 | 3 | 7-Me | — | SP018 | 9:1 |
| 178 | 64 | 48 | LA | 18 | 6 | 4-Me | — | SP018 | 10:1 |
| 179 | 65 | 49 | LA | 5 | 2 | 4-Me | — | SP018 | 12:1 |

Footnote to Table 15
ε-cap is ε-caprolactone.
alkyl ε-cap is alkyl-substituted ε-caprolactone showing the nature and position of the substituent.
δ-val is δ-valerolactone.
SP012 is EPOMIN SP012 (MW 1,200).
SP018 is EPOMIN SP018 (MW 1,800).
SP300 is EPOMIN SP300 (MW 30,000).
P1050 is EPOMIN P1050 (50% aqueous solution; MW 70,000).
Polymin P is PEI (MW 20,000 ex. BASF).
The EPOMIN PEI is available from Nippon Shokubai.
LA is lauric acid.
HA is hexanoic acid.

Examples 180 to 187

The fluidity of dispersions of Monolite Rubine 3B using Dispersants 58 to 65 were assessed using the method described in Examples 88 to 116 and using the same arbitrary scale. The results are recorded in Table 16.

TABLE 16

| Example | Dispersant | Fluidity |
|---|---|---|
| 180 | 58 | B |
| 181 | 59 | B/C |
| 182 | 60 | B/C |
| 183 | 61 | A/B |
| 184 | 62 | A |
| 185 | 63 | B |
| 186 | 64 | B |
| 187 | 65 | B/C |
| Control | — | B |

Footnote to Table 16
Control is as described in the footnote to Table 7.

Preparation of Anionic Dispersants
Intermediates

Example 188
DO 1, ε-cap 12, 7-Me ε-cap 6

Dodecanol (10 parts, 0.0536M ex. Koch-Light), ε-caprolactone (73.4 parts, 0.644M ex. Aldrich) and 7-methyl-ε-caprolactone (Lactone 2, 41 parts, 0.312M) were stirred under nitrogen and heated to 100° C. Zirconium isopropoxide catalyst (0.2 parts, ex. Aldrich) was added, the temperature raised to 175° C. and the reactants were stirred at this temperature for 6 hours. After cooling, the product was obtained as an off-white solid 122 parts). This is Intermediate 50.

Examples 189 to 196

Intermediates 51 to 58 as detailed in Table 17 were prepared in analogous manner to Intermediate 50 (Example 188) using the molar ratios of dodecanol, ε-caprolactone and either alkyl-substituted ε-caprolactone or δ-valerolactone as shown in Table 17.

TABLE 17

| Example | Intermediate | Lactone | DO | ε-cap | alkyl | ε-cap | δ-val | Appearance |
|---|---|---|---|---|---|---|---|---|
| 189 | 51 | — | 1 | 12 | — | — | 2 | White solid |
| 190 | 52 | 2 | 1 | 8 | 4 | 7-Me | — | White liquid |
| 191 | 53 | 5 | 1 | 12 | 3 | tri-Me | — | White solid |
| 192 | 54 | — | 1 | 12 | — | — | 4 | White solid |
| 193 | 55 | 3 | 1 | 6 | 6 | 5-Me | — | Yellow viscous liquid |
| 194 | 56 | 1 | 1 | 12 | 2 | 4-Me | — | Waxy white solid |
| 195 | 57 | — | 1 | 12 | — | — | 6 | White gum |
| 196 | 58 | 2 | 1 | 6 | 6 | 7-Me | — | Colourless solid |

Footnote to Table 17
DO is dodecanol.
ε-cap is ε-caprolactone.
Alkyl ε-cap is alkyl-substituted ε-caprolactone indicating the nature and position of the substituent.
δ-val is δ-valerolactone.
TPOAC alcohol is the terminal end-capped polyoxyalkylene chain alcohol.

Anionic Dispersants

Example 197

(DO 1, ε-cap 12, 7-Me ε-cap 6) 3:1 phosphorus

Intermediate 50 (30 parts ex. Example 188) was stirred under nitrogen and heated to 60° C. Polyphosphoric acid (1.47 parts, 83% strength ex. Fluka) was added with vigorous stirring and the reactants heated to 95° C. and stirred at this temperature for 6 hours. An aliquot was removed and the Acid value measured as 66.7 mg KOH/gm. The reactants were cooled to 60° C. and diethanolamine (3.77 parts; 0.036M ex. Fisons) was added and the reactants stirred at 60° C. under nitrogen for a further 45 minutes. On cooling, the product was obtained as an off-white gum (30 parts). This is Dispersant 66. The ratio of the TPOAC alcohol (DO 1, ε-cap 12, 7-Me ε-cap 6) to the phosphorus pentoxide molecule in the polyphosphoric acid is 3:1.

Example 198 to 217

Dispersants 67 to 86 were prepared in similar manner to Dispersant 66 (Example 197) using Intermediates 50 to 58 and varying the ratio of the TPOAC alcohol to phosphorus atom of the polyphosphoric acid as shown in Table 18. These dispersants were isolated in the form of an amine salt as detailed in the table and all were obtained as either a white or off-white gum.

TABLE 18

| Example | Dispersant | Intermediate | DO | ε-cap | alkyl-ε-cap | | δval | Acid Value mg KOH/gm | Amine | Phosphorus ratio |
|---|---|---|---|---|---|---|---|---|---|---|
| 198 | 67 | 54 | 1 | 12 | — | — | 4 | 106.7 | DEA | 3:1 |
| 199 | 68 | 53 | 1 | 12 | 3 | tri-Me | — | 86.2 | DEA | 3:1 |
| 200 | 69 | 56 | 1 | 12 | 2 | 4-Me | — | 82.1 | DEA | 3:1 |
| 201 | 70 | 57 | 1 | 12 | — | — | 6 | 67.1 | DEA | 3:1 |
| 202 | 71 | 52 | 1 | 8 | 4 | 7-Me | — | 85.5 | DEA | 3:1 |
| 203 | 72 | 58 | 1 | 6 | 6 | 7-Me | — | 34.6 | DEA | 3:1 |
| 204 | 73 | 51 | 1 | 12 | — | — | 2 | 58.8 | DEA | 3:1 |
| 205 | 74 | 57 | 1 | 12 | — | — | 6 | 61.7 | DEA | 3:1 |
| 206 | 75 | 53 | 1 | 12 | 3 | tri-Me | — | 93.6 | DEA | 2:1 |
| 207 | 76 | 51 | 1 | 12 | — | — | 2 | 93.3 | DEA | 2:1 |
| 208 | 77 | 50 | 1 | 12 | 6 | 7-Me | — | 86.2 | DMAPA | 2:1 |
| 209 | 78 | 51 | 1 | 12 | — | — | 2 | 61.9 | DMAPA | 2:1 |
| 210 | 79 | 54 | 1 | 12 | — | — | 4 | 31.6 | DMAPA | 2:1 |
| 211 | 80 | 56 | 1 | 12 | 2 | 4-Me | — | 51.0 | DMAPA | 2:1 |
| 212 | 81 | 55 | 1 | 6 | 6 | 5-Me | — | 84.4 | DMAPA | 3:1 |
| 213 | 82 | 50 | 1 | 12 | 6 | 7-Me | — | 56.0 | BA | 3:2 |
| 214 | 83 | 50 | 1 | 12 | 6 | 7-Me | — | 70.8 | DEA | 3:2 |
| 215 | 84 | 56 | 1 | 12 | 2 | 4-Me | — | 87.6 | DEA | 3:2 |
| 216 | 85 | 57 | 1 | 12 | — | — | 6 | 24.2 | DEA | 3:2 |
| 217 | 86 | 58 | 1 | 6 | 6 | 7-Me | — | 33.3 | DEA | 3:2 |

Footnote to Table 18
DO, ε-cap, alkyl-ε-cap, δ-val and TPOAC are as explained in the footnote to Table 17.
DEA is diethanolamine.
BA is n-butylamine.
DMAPA is dimethylaminopropylamine.

Example 218 to 235

Dispersants 66 to 86 (2 parts) were dissolved separately in methoxypropylacetate, n-butylacetate and toluene (10 ml) at 20° C. and then placed in a refrigerator at 4° C. for 3 days. The solutions were evaluated for clarity and the presence of seeds or crystals. The results are given in Table 19.

TABLE 19

| Example | Dispersant | Solubility MPA 20° C. | MPA 4° C. | BAc 20° C. | BAc 4° C. | TOL 20° C. | TOL 4° C. |
|---|---|---|---|---|---|---|---|
| 218 | 66 | H | H | H | H | C | C |
| 219 | 67 | H | S | H | S | C | C |
| 220 | 68 | C | sl H | C | C | C | C |
| 221 | 71 | C | C | C | C | C | C |
| 222 | 72 | H | H | H | H | C | C |
| 223 | 73 | C | sl S | C | sl S | C | C |
| 224 | 74 | C | sl H | C | C | C | C |
| 225 | 75 | C | sl S | C | sl S | C | C |
| 226 | 76 | C | C | C | C | C | C |
| 227 | 77 | H | H | H | H | H | H |
| 228 | 78 | C | sl S | C | sl S | C | C |
| 229 | 79 | C | sl H | C | sl H | C | C |
| 230 | 80 | C | sl S | C | sl HS | C | C |
| 231 | 81 | H | H | H | H | C | C |
| 232 | 82 | H | H | H | H | H | H |
| 233 | 83 | H | H | H | H | C | C |
| 234 | 85 | C | sl H | C | sl H | C | C |
| 235 | 56 | C | sl H | C | sl H | C | C |
| | Control | H | H | sl H | S | C | sl S |

Footnote to Table 19
H is hazy, C is clear, S is seeds present and sl is slight.
MPA is methoxypropylacetate.
BAc is n-butylacetate.
TOL is toluene.
Control is the phosphate of the reaction product of lauryl alcohol with ε-caprolactone.

Example 236

(LA1, ε-cap 12, δ-val 3) PAL 1

Polyallylamine hydrochloride (5 parts ex. Aldrich) was dissolved in water (30 parts) and stirred for 20 minutes. Amberlite IRA 68 (15 parts ex. Aldrich) was added and stirred for a further 2 hours until the pH was 7.8. The Amberlite was then removed by filtration and the polyallylamine free base was added to Intermediate 19 and the reactants heated under nitrogen to 130° C. and stirred for a further 6 hours under nitrogen at 130° C. The reaction product was obtained as a cream viscous liquid which cooled to a cream wax:(40 parts). The weight ratio of the TPOAC acid (Intermediate 19) to polyallylamine (PAL) was 13:1. This is Dispersant 87.

Dispersant 87 (2 parts) was dissolved in a 4:1 mixture of methoxypropylacetate/n-butanol which gave a hazy solution both at 20° C. and after storage for 2 days at 4° C. In comparison the control (ε-caprolactone polymerised in the presence of lauric acid and reacted with PEI (MW 10,000)) exhibited crystals on storage for 2 days at 4° C.

Example 237

HA 1, ε-cap 12, 7-Me 3) PAL 1

Dispersant 88 was prepared in identical manner to Dispersant 87 (Example 236) except replacing Intermediate 19 with an equal weight of Intermediate 46 (Example 177). The dispersant was obtained as a cream wax (40 parts) and again the weight ratio of TPOAC acid (intermediate 46) to polyallylamine (pal) was 13:1.

What is claimed is:

1. A dispersant of general Formula 1

$$T\text{---}(A)_n(B)_p\text{---}Z \quad (1)$$

wherein
T is hydrogen or a polymerisation terminating group;
Z is an acidic or basic group or a moiety containing either an acidic or basic group where the basic group or moiety containing the basic group represented by Z is attached to T—$(A)_n(B)_p^-$ by an amide and/or salt link and where the acidic group is selected from sulphate, sulphonate, phosphate and phosphonate;
A and B are each, independently, oxyalkylene carbonyl groups derived from δ-valerolactone, ε-caprolactone or alkyl substituted ε-caprolactone provided that both are not ε-caprolactone or δ-valerolactone;
n and p are integers; and
n+p is from 2 to 100;
including salts thereof.

2. A dispersant as claimed in claim 1 wherein n+p is not greater than 20.

3. A dispersant as claimed in either claim 1 or claim 2 wherein A is derived from ε-caprolactone and B is derived from alkyl substituted ε-caprolactone.

4. A dispersant as claimed in either claim 1 or claim 2 wherein A is derived from ε-caprolactone and B is derived from either δ-valerolactone or alkyl substituted ε-caprolactone and the ratio of n:p is between 8:1 and 1:2.

5. A dispersant as claimed in claim 1 wherein the alkyl substituent of ε-caprolactone is $C_{1-4}$-alkyl.

6. A dispersant as claimed in claim 5 wherein the alkyl substituent is methyl.

7. A dispersant as claimed in claim 1 which comprises a poly ($C_{2-4}$-alkyleneimine) (PAI) carrying at least two polyoxyalkylene carbonyl (POAC) chains of Formula 2

$$T\text{---}(O\text{---}V\text{---}CO)\overline{_{n+p}} \quad (2)$$

wherein:
V is a polyoxyakylenecarbonyl (POAC) chain moiety —$(A)_n(B)_p^-$; and
T, n and p are as defined in claim 1.

8. A dispersant as claimed in claim 7 wherein V is the group —$(A)_n(B)_p^-$ wherein A is an oxyalkylenecarbonyl group derived from ε-caprolactone and B is an oxyalkylenecarbonyl group derived from alkyl substituted ε-caprolactone or δ-valerolactone and the ratio of n:p is from 8:1 to 1:1.

9. A dispersant as claimed in claim 7 of general Formula 3

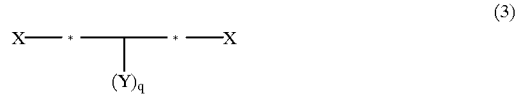

(3)

wherein
X—*—*—X represents poly($C_{2-4}$-alkyleneimine) (PAI);
Y is a polyoxyalkylenecarbonyl (POAC) chain linked to poly($C_{2-4}$-alkyleneimine) (PAI) via an amide or salt linkage; and
q is from 2 to 2000.

10. A dispersant as claimed in claim 9 wherein the weight ratio off $(Y)_q$ to poly($C_{2-4}$-alkyleneimine) (PAI) is between 30:1 and 1:1.

11. A dispersant as claimed in claim 9 wherein the weight ratio of $(Y)_q$ to poly($C_{2-4}$-alkyleneimine) (PAI) is between 15:1 and 10:1.

12. A dispersant as claimed in claim 1 wherein the MW of poly($C_{2-4}$-alkyleneimine) (PAI) is from 1,000 to 100,000.

13. A dispersant as claimed in claim 1 wherein the poly($C_{2-4}$-alkyleneimine) (PAI) is polyethyleneimine.

14. A dispersant as claimed in claim 1 wherein T is derived from a $C_{1-25}$-aliphatic carboxylic acid optionally substituted by hydroxy, $C_{1-4}$-alkoxy or halogen.

15. A dispersant as claimed in claim 14 wherein the carboxylic acid is selected from glycolic, lactic, caproic, lauric, stearic, methoxyacetic, ricinoleic, 12-hydroxystearic, 12-hydroxydodecanoic, 5-hydroxydodecanoic, 5-hydroxydecanoic and 4-hydroxydecanoic acids.

16. A dispersant as claimed in claim 15 wherein the carboxylic acid is lauric acid.

17. A dispersant as claimed in claim 1 which has Formula 5

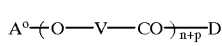   (5)

wherein
- $A^1$ and D are groups, one of which is or carries an acidic group and the other is a polymerisation terminating group which does not render the end-capped polyoxyalkylenecarbonyl (TPOAC) chain hydrophilic;
- V is a polyoxyalkylenecarbonyl (POAC) chain moeity —$(A)_n(B)_p^-$;
- n and p are integers; and
- n+p is from 2 to 100;

including salts thereof.

18. A dispersant as claimed in claim 17 wherein when $A^1$ carries the acidic group, D is the residue of an alcohol, thiol or primary or secondary amine $D^1$—K—H in which $D^1$ is an aliphatic or alicyclic group, K is O, S or NR in which R is H, alkyl, alkenyl, cycloalkyl or phenyl.

19. A dispersant as claimed in either claim 17 or claim 18 which has Formula 8

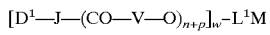   (8)

wherein
- $D^1$ is unsubstituted $C_{1-50}$-hydrocarbyl or $C_{1-50}$-hydrocarbyl substituted by halogen, tertiary amino or $C_{1-6}$-alkoxy;
- J is O, NR or a direct link;
- V is a polyoxyalkylenecarbonyl (POAC) chain moiety —$(A)_n(B)_p^-$;
- R is H, alkyl, alkenyl, cycloalkyl or phenyl;
- $L^1$ is sulphate or phosphate,
- M is a cation;
- w is 1 or 2 and
- n and p are integers; and
- n+p is from 2 to 100.

20. A dispersant as claimed in claim 19 wherein J is O.

21. A dispersant as claimed in claim 20 wherein $D^1$ is alkyl.

22. A dispersant as claimed in claim 21 wherein $D^1$ is diodecanyl.

23. A dispersant as claimed in claim 19 wherein V is a polyoxyalkylenecarbonyl (POAC) chain moiety —$(A)_n(B)_p^-$ wherein A is an oxyalkylenecarbonyl group derived from ε-caprolactone, B is an oxyalkylenecarbonyl chain derived from alkyl-substituted ε-caprolactone or δ-valerolactone and the ratio of n:p is from 8:1 to 1:1.

24. A dispersant as claimed in claim 19 wherein M is an amine, alkanolamine or quaternary ammonium salt.

25. A dispersant as claimed in claim 24 wherein the amine is n-butylamine, diethanolamine or diaminopropylamine.

26. A dispersant as claimed in claim 19 wherein $L^1$ is phosphate.

27. A dispersant as claimed in claim 26 wherein the ratio of end-capped polyoxyalkylenecarbonyl (TPOAC) alcohol to phosphorus atom is between 3:1 and 1:1.

28. A process for making a dispersant as claimed in claim 7 which comprises reacting a end-capped polyoxyalkylenecarbonyl (TPOAC) acid with a poly($C_{2-4}$-alkyeneimine) (PAI) at a temperature between 80 and 150° C.

29. A process as claimed in claim 28 wherein the end-capped polyoxyalkyienecarbonyl (TPOAC) acid is prepared by reacting a lactone(s) with an aliphatic carboxylic acid in an inert atmosphere at from 150 to 180° C. in the presence of an esterification catalyst.

30. A process for making a dispersant as claimed in claim 19 which comprises polymerising a lactone(s) in the presence of a monohydric alcohol or a primary or secondary monoamine to form a end-capped polyoxyalkyienecarbonyl (TPOAC) alcohol and reacting the TPOAC alcohol with a phosphating agent.

31. A composition comprising a particulate solid and a dispersant as claimed in claim 1.

32. A dispersion comprising a dispersant as claimed in claim 1, a particulate solid and an organic medium.

33. A dispersion as claimed in claim 32 wherein the organic medium is a polar organic liquid.

34. A mill-base comprising a dispersant as claimed in claim 1, a particulate solid and a film-forming resin.

35. A paint or ink comprising a dispersant as claimed in claim 1.

36. An end-capped polyoxyalkylenecarbonyl (TPOAC) acid of Formula 12

   (12)

wherein
- T is a polymerisation terminating group;
- V is a polyoxyalkylenecarbonyl (POAC) chain moiety —$(A)_n(B)_p^-$;
- A and B are each, independently, oxyalkylenecarbonyl groups derived from δ-valerolactone, ε-caprolactone or alkyl-substituted ε-caprolactone provided that both are not ε-caprolactone or δ-valerolactone;
- n and p are integers; and
- n+p is from 2 to 100.

37. An end-capped polyoxyalkylenecarbonyl (TPOAC) alcohol of Formula 13

   (13)

wherein
- $D^1$ is an aliphatic or alicyclic group,
- J is O, NR or a direct link;
- R is H, alkyl, alkenyl, cycloalkyl or phenyl;
- V is a polyoxyalkylenecarbonyl (POAC) chain moiety —$(A)_n(B)_p^-$;

A and B are each, independently, oxyalkylenecarbonyl groups derived from δ-valerolactone, ε-caprolactone or alkyl-substituted ε-caprolactone provided that both are not ε-caprolactone or δ-valerolactone;

n and p are integers; and n+p is from 2 to 100.

38. A paint or ink comprising a composition as claimed in claim 31.

39. A paint or ink comprising a millbase as claimed in claim 34.

* * * * *